Dec. 13, 1927.                                        1,652,936
J. A. HEINZ
FLORAL RACK
Original Filed April 6, 1925

Inventor
J. A. Heinz
By
Lacey & Lacey, Attorneys

Patented Dec. 13, 1927.

1,652,936

UNITED STATES PATENT OFFICE.

JULIUS A. HEINZ, OF PESOTUM, ILLINOIS; KATHRYN KERWIN HEINZ AND FRED B. HAMILL EXECUTORS OF SAID JULIUS A. HEINZ, DECEASED.

FLORAL RACK. REISSUED

Application filed April 6, 1925, Serial No. 21,023. Renewed November 15, 1926.

This invention relates to improvements in floral racks and more particularly to floral racks designed for use by undertakers and funeral directors in supporting floral pieces in funeral houses where floral offerings are displayed, in churches and at the graves and one of the objects of the present invention is to provide a device for this purpose which will be simple in construction, inconspicuous in appearance, and capable of being readily handled and carried in compact form so that it will not present the bulky and clumsy appearance which such devices ordinarily present.

Another object of the invention is to provide a floral rack for the purpose stated so constructed that it may be folded into compact form and a number of the devices readily packed together and carried about so that the carrying of the devices into the home of the deceased and the arrangement thereof in position to support the floral decorations will not detract from the solemnity of the occasion.

Another object of the invention is to so construct the device that a floral decoration disposed thereon and supported thereby will not be liable to slip from place or become disarranged should the device be accidentally jarred or disturbed.

Another object of the invention is to so construct the device that floral designs may be supported at different angles of inclination. This is an important feature of the invention inasmuch as some floral designs are best displayed when supported nearly in an upright position and others are best displayed when supported more nearly horizontal, and, in this respect, the invention constitutes an improvement over previously employed devices intended for the same use.

Another object of the invention is to provide a floral rack for the purpose stated which may be manufactured at a low cost so that a considerable number of the devices may be employed without any considerable expense being involved in their use.

Another object of the invention is to so construct the device that the same may be disposed upon a casket, on the floor, upon chairs, stands, pedestals, mantels, or pianos, without liability of overturning and without liability of being disturbed in the event the floral pieces should be unnecessarily handled by those present.

Figure 1:
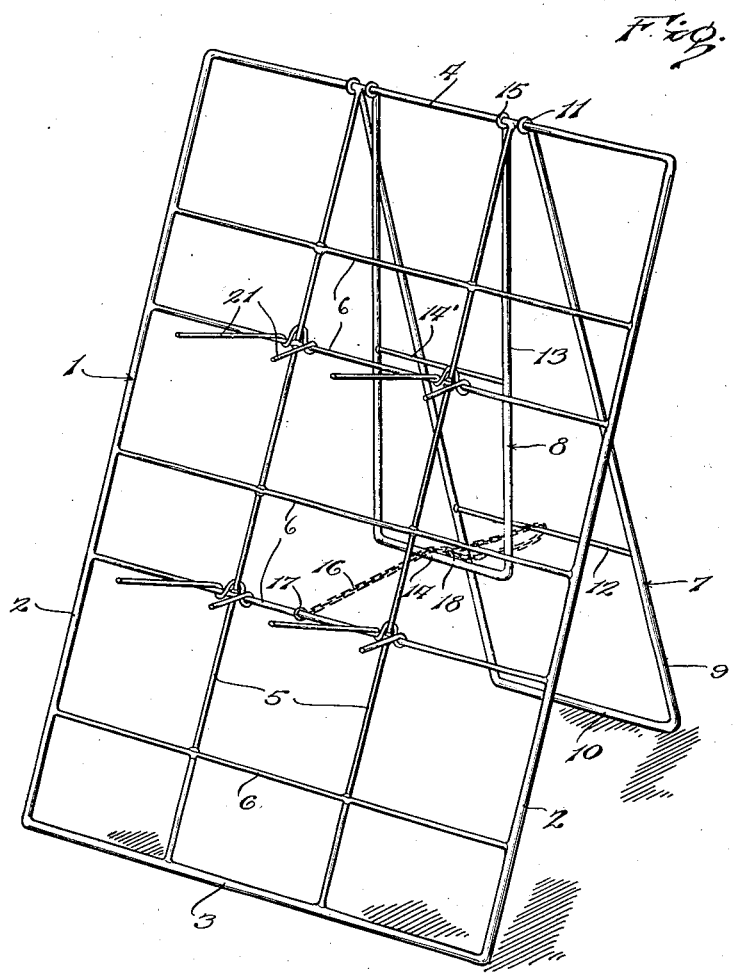
Figure 1 is a perspective view of the floral rack embodying the invention, arranged in a more or less upright position.

The floral rack embodying the present invention is preferably formed from wire or rod material, depending, of course, upon the different sizes in which the article will be manufactured, and the same comprises a frame which is illustrated in the present drawings as rectangular in form, although it may assume various other forms, the frame, in the present instance, being indicated in general by the numeral 1 and comprising side members 2, a bottom member 3, and a top member 4. The frame further includes vertical frame rods 5 and horizontal frame rods 6 which extend respectively between the lower frame member 3 and the upper frame member 4, and between the side frame members 2. In practice, the frame rods will be united at their ends and at their points of intersection, by electric welding or otherwise, so as to form neat joints, although it will be understood that if the device is made in an exceptionally small size, the wires may be suitably joined by bending the same at their points of connection. Ordinarily, however, the structure will, as a whole, be substantially flat inasmuch as floral sets or pieces are ordinarily so constructed.

The invention contemplates, as previously explained, the provision of means for supporting the frame structure at different angles of inclination so that the floral design or piece may be displayed to the best advantage and in the most desirable manner, and this means comprises two standard members which are indicated in general, one by the numeral 7 and the other by the numeral 8. The standards 7 and 8 are of substantially counterpart construction except as regards their dimensions. The standard 7 is relatively long and comprises a length of wire bent to provide spaced parallel side members 9 and a connecting cross member 10, the ends of the side members opposite the ends which are connected by the cross member, being bent to provide eyes 11 which are pivotally engaged with the top member 4 of the frame 1. Cross members 12 are preferably provided to relatively brace the side members 9 of the standard 7 and extend between said side members and are secured at their ends to the same, these cross members being of wire or rod material, depending upon the size of the device. The standard 8 comprises spaced side members 13 formed by bending a length of wire to the required form, and a connecting cross member 14, and the upper ends of the side members are formed to provide pivot eyes 15 which are pivotally engaged with the top member 4 of the frame 1. The pivot eyes 11 at the upper end of the standard 7 pivotally engage the top or cross member 4 at the outer sides of the points of connection of the vertical frame members 5 with the said member 4 so that transverse displacement of the standard is prevented, and in a like manner, the pivot eyes 15 at the upper ends of the side members 13 of the standard 8, pivotally engage the said member 4 at the inner sides of the points of connection of the members 5 with the cross member 4 to prevent sidewise displacement of the said standard member 8. Likewise, due to the fact that the standard member 8 is of slightly less width than the standard member 7, it is adapted to be received between the spaced side members 9 of the standard 7 when the standards are collapsed against the rear side of the frame structure.

Figure 2:
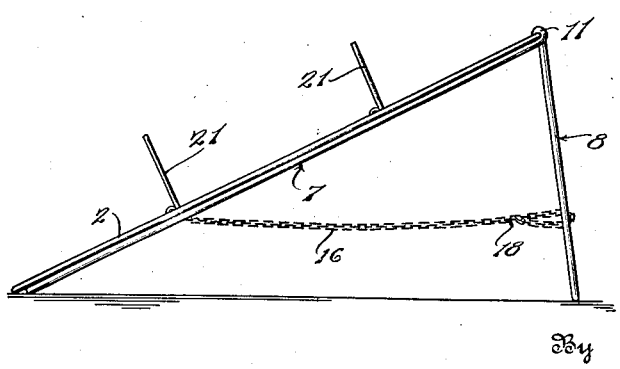
Figure 2 is a side elevation of the rack, arranged in a position to support a floral decoration in a less inclined position.

Referring to Figure 1 of the drawings, it will be observed that the frame structure 1 may be supported in a more or less upright position by disposing the standard 7 at an angle thereto with its cross member 10 resting upon the support upon which the corresponding cross member 3 of the frame structure is disposed, whether this be the top of the casket, a table, a mantel, or any other supporting surface. By reference to Figure 2, it will be observed that if the frame structure 1 is to be supported in a more or less horizontal position to better display the floral piece or decoration when this is desired, the standard 7 is folded to position lying against the under side of the frame structure 1 and the standard 8 is then employed as the supporting means for the frame structure 1. It is, of course, necessary to provide means to prevent collapse of the structure when the same is set up in supporting position and this means is preferably in the nature of a chain or other flexible element, indicated by the numeral 16, which is connected at one end, as at 17, to one of the cross members 6 of the frame structure 1 and is engaged about the cross member 12 of the standard 7 or the cross member 14' of the standard 8. The chain is provided at its other end with a hook 18 which may be interchangeably engaged with its links so that the standard 7 or standard 8 may be braced at various angles with relation to the frame structure, thus providing for support of the frame structure 1 at different positions of inclination and enabling the undertaker or funeral director to support the floral piece or decoration at any desired angle. For example, the standard 8 may be employed to support the frame structure at inclinations of from twenty to forty degrees whereas the standard 7 may be employed to support the frame structure at angles from forty degrees to approximately vertical position.

Figure 3:
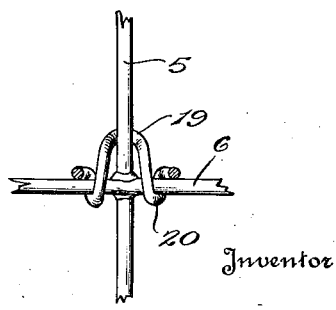
Figure 3 is a detail fragmentary view, partly in section, illustrating one of the devices provided for engaging a floral piece or decoration.

In order to support the floral design or set upon the frame structure 1, means is provided which will now be described. Said means comprises a plurality of supporting members each of which is preferably formed from a single piece of wire bent intermediate its ends to provide a bight portion 19 and pintle eyes 20 which are located at the opposite sides of the bight portion and pivotally engage the cross members 6 of the supporting frame structure. Beyond the eye portions 20, the wire comprising each of the supporting members is extended to provide diverging supporting fingers indicated by the numeral 21, which are designed to support the floral decoration or set. It will be observed by reference to Figure 3 of the drawings, that in the supporting position of the supporting members, the bights 19 thereof engage against the rear sides of the vertical frame rods 5 and the supporting fingers 21 extend approximately at right angles from the plane occupied by the supporting frame structure as a whole, as will be best observed by reference to Figure 1. When the supporting members are in the supporting position illustrated in Fiugre 1, they are adapted to pierce but, of course, not mutilate a floral set or piece disposed upon the supporting frame structure and support the same against displacement, and they perform this function without injury to a floral piece or set for the reason that such pieces are ordinarily more or less loosely woven or intertwined, so that interstices are present in the floral piece or set and permit of the supporting fingers piercing the same without injury thereto or detracting from the appearance thereof.

As before stated, the eyes 20 pivotally embrace the transverse frame members 6 so that the supporting members may be folded to lie flat against the frame structure when the structure is collapsed and not in use but it will be evident, as before stated, that when the supporting members are swung downwardly to supporting position as illustrated in Figure 1 of the drawings, a floral piece may be disposed against the said members and will be penetrated thereby, and firmly and securely supported in proper position. It will, furthermore, be evident that the supporting members for the floral piece or set are so constructed and arranged that there can be no accidental displacement of the piece or set and the same will be securely supported in proper position for display. It will likewise be evident that the floral piece or set may be readily removed from the supporting structure embodying the invention without mutilating the same so that, during the period of time the piece or set is supported for display, it is securely supported and held in position and, when it has served its purpose, may be removed without mutilation and without disarrangement of its component parts and, likewise, without any disarrangement of the easel embodying the invention.

It will likewise be evident that floral pieces or sets may be supported at various angles by the use of the rack embodying the invention and thus displayed to the best advantage and in accordance with the wishes of the undertaker or funeral director.

It will also be evident that a number of the devices may be compactly arranged in a stack without interference one with another and, therefore, a considerable number of the devices may be employed at a funeral without conspicuous display of mechanical devices for supporting the various floral decorations.

Having thus described the invention, what I claim is:

1. The combination with vertical and horizontal members, of a foldable support, comprising pintle eyes on the horizontal member, with the vertical member therebetween, a bight spanning the vertical member and connecting the pintle eyes, and an article engaging element projecting from the said pintle eyes and held in operative position by said bight portion engaging the vertical member.

2. The combination with a frame comprising vertical and horizontal members, of a foldable support consisting of a length of wire doubled upon itself and having the folded portions bent to provide eyes which are mounted upon the said horizontal member upon opposite sides of the vertical member, the bight formed by the fold being adapted to span and engage the vertical member, and the end portions beyond the eyes forming article engaging fingers.

3. A floral rack comprising a wire frame, a plurality of standards mounted on said frame, each of said standards being capable of adjustment in a plurality of positions for supporting the frame in a plurality of inclined positions, a flexible member for adjustably connecting the frame and the respective supporting standard for maintaining said frame in the desired inclined position, and means for supporting floral pieces on said frame comprising wire supporting fingers looped about the frame, the said fingers being provided with means for maintaining them at an angle to the frame and, for permitting the same to be collapsed into position substantially flat against the body of said frame, substantially as set forth.

4. A floral rack comprising a wire frame, standards of different lengths connected with the frame for supporting the same in a plurality of positions of angular adjustment and a supporting member looped about the frame for pivotal movement against the body of the frame, said supporting member having diverging fingers and means to maintain the same in position of use, substantially as set forth.

5. The combination of an elongated frame, crossed members on said frame, a support pivoted on one of said members extending perpendicularly thereof and having means thereon to engage another of the said members to hold the same at an angle to the frame, substantially as set forth.

6. A floral display rack comprising a wire frame having a plurality of substantially U-shaped wire supports of different lengths pivoted thereto adjacent its upper end, supporting fingers pivoted on said wire frame and having means for maintaining them at an angle to the frame, and means on said frame for engaging either of said supports for maintaining each of the same in a plurality of frame supporting positions, substantially as set forth.

In testimony whereof I affix my signature.

JULIUS A. HEINZ. [L. S.]